US011579025B2

(12) United States Patent
LeBlanc et al.

(10) Patent No.: US 11,579,025 B2
(45) Date of Patent: Feb. 14, 2023

(54) SENSOR TO MEASURE THERMAL CONDUCTIVITY AND HEAT CAPACITY OF RESERVOIR FLUIDS

(71) Applicant: Halliburton Energy Services, Inc., Houston, TX (US)

(72) Inventors: Michel Joseph LeBlanc, Houston, TX (US); Christopher Michael Jones, Katy, TX (US); Michael Thomas Pelletier, Houston, TX (US); Peter Olapade, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 449 days.

(21) Appl. No.: 16/757,984

(22) PCT Filed: May 16, 2019

(86) PCT No.: PCT/US2019/032721
§ 371 (c)(1),
(2) Date: Apr. 21, 2020

(87) PCT Pub. No.: WO2020/231446
PCT Pub. Date: Nov. 19, 2020

(65) Prior Publication Data
US 2021/0356333 A1 Nov. 18, 2021

(51) Int. Cl.
*G01K 11/3206* (2021.01)
*E21B 49/08* (2006.01)
(Continued)

(52) U.S. Cl.
CPC ...... *G01K 11/3206* (2013.01); *E21B 49/0875* (2020.05); *G01K 1/16* (2013.01);
(Continued)

(58) Field of Classification Search
CPC ........ G01K 11/3206; G01K 1/16; G01K 1/14; G01K 13/02; E21B 49/0875; E21B 49/10
See application file for complete search history.

(56) References Cited

U.S. PATENT DOCUMENTS

| 5,251,479 A * | 10/1993 | Siegfried, II | ......... E21B 47/103 73/19.1 |
| 6,283,632 B1 * | 9/2001 | Takaki | ................... G01K 11/18 374/161 |

(Continued)

FOREIGN PATENT DOCUMENTS

WO   2005064117   7/2005

OTHER PUBLICATIONS

ISRWO International Search Report and Written Opinion for PCT/US2019/032721 dated Feb. 14, 2020.

*Primary Examiner* — Nathaniel T Woodward
*Assistant Examiner* — Philip L Cotey
(74) *Attorney, Agent, or Firm* — John Wustenberg; C. Tumey Law Group PLLC

(57) ABSTRACT

A thermal sensor module, comprising: a housing, wherein the housing comprises a first end and a second end, wherein the housing is hollow and configured to allow a fluid to flow into the housing through the first end and exit through the second end; a heat source, wherein the heat source is disposed at a central axis of the housing and traverses at least partially through the housing; and a temperature sensor, wherein the temperature sensor is positioned in the housing to measure temperature of the fluid flowing in the housing.

20 Claims, 5 Drawing Sheets

(51) Int. Cl.
   *G01K 1/16*   (2006.01)
   *E21B 49/10*   (2006.01)
   *G01K 1/14*   (2021.01)
   *G01K 13/02*   (2021.01)

(52) U.S. Cl.
   CPC ............... *E21B 49/10* (2013.01); *G01K 1/14* (2013.01); *G01K 13/02* (2013.01)

(56) References Cited

U.S. PATENT DOCUMENTS

| | | | |
|---|---|---|---|
| 8,122,951 B2* | 2/2012 | Fukuhara | E21B 47/07 166/250.01 |
| 8,910,514 B2* | 12/2014 | Sullivan | E21B 49/08 73/152.55 |
| 9,733,444 B2* | 8/2017 | LeBlanc | G02B 6/4486 |
| 9,790,782 B2* | 10/2017 | Xia | G01N 25/18 |
| 9,791,595 B2* | 10/2017 | Xia | E21B 47/07 |
| 10,120,102 B2* | 11/2018 | Tsakalakos | G01N 27/02 |
| 2002/0057436 A1* | 5/2002 | Skinner | G01D 5/35303 356/477 |
| 2006/0010973 A1* | 1/2006 | Brown | E21B 47/103 73/204.11 |
| 2006/0214098 A1* | 9/2006 | Ramos | G01F 1/6884 374/E11.015 |
| 2013/0219997 A1* | 8/2013 | Sullivan | E21B 49/10 73/53.01 |
| 2014/0238667 A1* | 8/2014 | Dumont | E21B 49/082 166/250.01 |
| 2014/0294041 A1* | 10/2014 | Zhang | G01F 1/6884 374/54 |
| 2016/0216187 A1* | 7/2016 | Gao | E21B 49/10 |
| 2016/0258279 A1* | 9/2016 | Xia | E21B 49/081 |
| 2017/0010430 A1* | 1/2017 | LeBlanc | G02B 6/4486 |
| 2017/0284197 A1* | 10/2017 | Dumont | E21B 47/07 |
| 2018/0313214 A1* | 11/2018 | Xia | G01N 29/265 |
| 2020/0018162 A1* | 1/2020 | Price | G01N 21/84 |
| 2020/0018739 A1* | 1/2020 | Khan | E21B 47/07 |
| 2020/0041689 A1* | 2/2020 | Kirkwood | G01V 9/00 |

* cited by examiner

SENSOR TO MEASURE THERMAL CONDUCTIVITY AND HEAT CAPACITY OF RESERVOIR FLUIDS

BACKGROUND

During drilling or production operations of a reservoir, the thermophysical properties, such as thermal conductivity, specific heat, and viscosity of the downhole hydrocarbon fluid may affect production efficiency and cost. High viscosity hydrocarbon fluid production may require the application of external heat to reduce the viscosity of the fluid and enable fluid transport from one place in the reservoir to a well location. Efficiency of production may depend upon the external heating power and thermal energy transport within a limited time interval. Higher thermally conductive hydrocarbon fluid may effectively transport the thermal energy further than low thermally conductive fluids. It may be desirable to measure thermal conductivity properties or heat capacity of formation fluids during wireline logging services and during production processes. The formation fluid thermal properties obtained may be used for wellbore completion, production efficiency control, and optimization.

The thermal conductivity properties of the downhole formation fluids may vary with pressure, temperature, and chemical composition or molecular weight. The measurement of thermal conductivity may therefore be used to identify formation fluids. Downhole formation fluids at different geometric locations may also have different thermophysical properties regarding viscosity, density, thermal conductivity, and specific heat capacity. Each of these properties may at least partially govern transportation and mobility of crude oils, including high viscosity crude oils, and may consequently impact the recovery process of the crude oils.

Reservoir hydrocarbon fluids may have similar specific heat capacities or thermal conductivity properties but different viscosity, density, and compressibility. Knowing these thermophysical properties of the hydrocarbon fluid may at least partially enable optimization of downhole tools, well completion design, and crude oil production processes. Presently, most thermophysical properties of the hydrocarbon fluid may typically be measured from samples that are taken downhole and then analyzed in a lab, which can take days, or even months. The potential phase transition may reduce the accuracy of any measurement due to the passage of time since sample collection and environmental changes at the collection point(s), which can occur over time.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
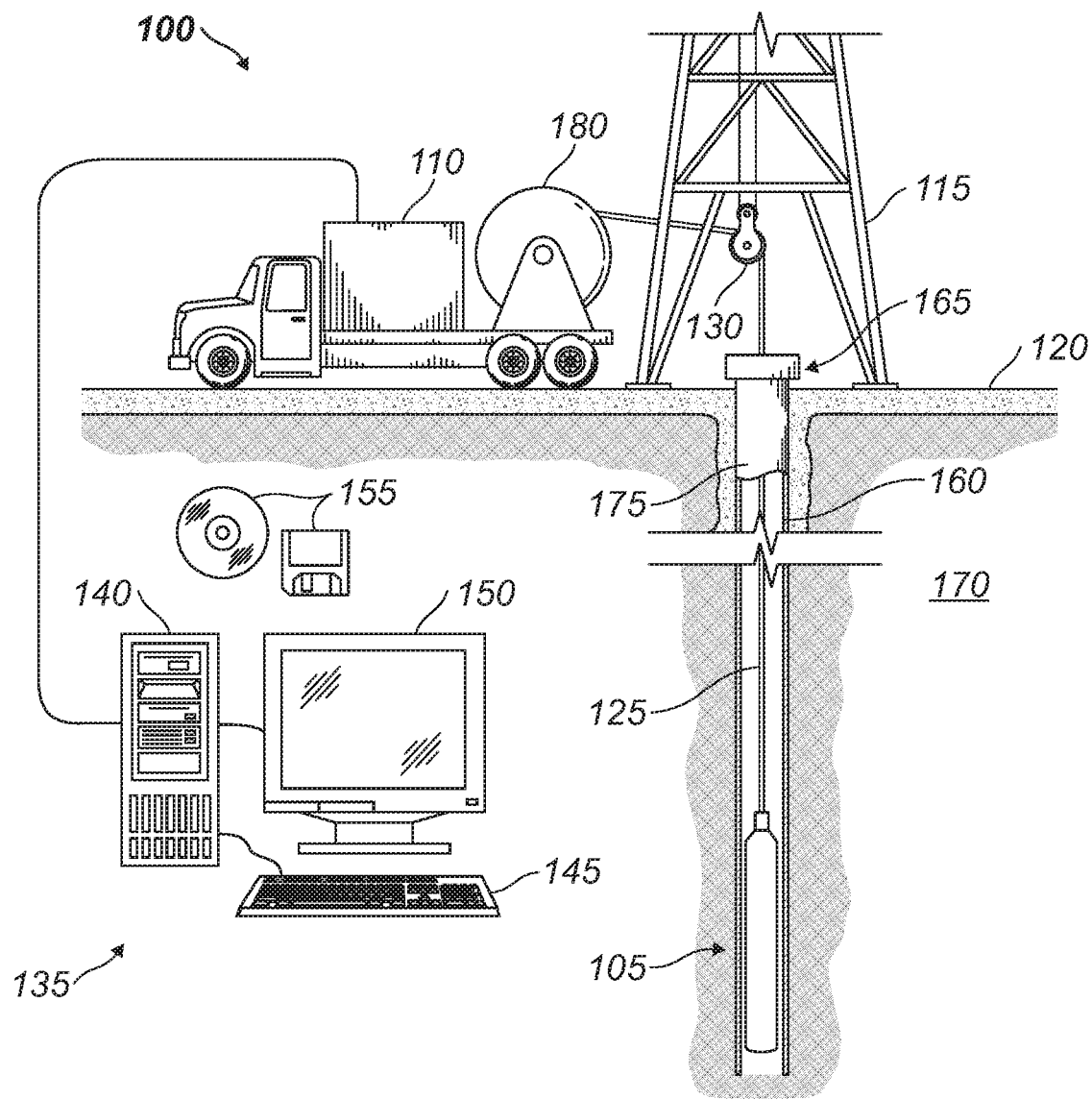
FIG. 1 illustrate an example of a well system.

The present disclosure relates generally to fluid sampling and downhole fluid identification and, more particularly, to an improved sensor module used to measure the thermal conductivity and the specific heat capacity of a reservoir fluid.

When collecting a fluid sample downhole, it may generally be desired that the fluid collected be as representative of the fluid present in the formation prior to disruption by the drilling activity. Unfortunately, filtrate fluid from the drilling mud may enter the formation during drilling such that when fluid is first collected from the formation, a certain proportion of that fluid will be mud filtrate. This may be referred to herein as "contamination" and is expressed as a volumetric ratio in percentage units. To reduce the contamination for the fluid sample collected, fluid may be pumped out of the formation and rejected into the wellbore while monitoring one or more fluid properties which change with the degree of contamination. Desirably, the fluid property being measured may vary monotonically with the degree of contamination and ideally with a linear relationship between the measured quantity and the contamination percentage. Thermal conductivity and heat capacity are two such fluid properties that may be used to provide a measurement contrast between mud filtrate and reservoir fluid during pre-sampling downhole pumpout operations.

Downhole fluid measurements may also be used to characterize the fluid such as its composition, gas-oil-ratio, and other properties. One objective of the downhole measurements may be to obtain sufficient information about the fluid so that its behavior and properties under varying thermodynamic conditions (e.g., pressure and temperature) can be predicted. The measurements may be used to parametrically fit equations-of-state (EOS) to the fluid properties to achieve this purpose. Once an EOS has been "fitted" to a particular set of measured properties, it may be used to predict other properties based on the same parameters. Thermal conductivity and heat capacity are two properties that an EOS may predict and therefore these properties may be used, alone or in combination with other fluid measurements, to fit the EOS parameters.

The improved sensor module in this disclosure may be capable of obtaining real-time measurements of thermal conductivity and specific heat capacity and may be complementary to existing downhole tools.

In the field of assessing reservoir fluids, physical models describing fluid behavior, such as EOS, may be central to geodynamic interpretation. An assessment may be conducted with data from fluid samples as well as downhole fluid analysis. In many cases, it may not be possible to acquire enough open hole fluid samples to adequately describe complex geodynamic processes. Therefore, downhole fluid analysis may be needed to supplement sample data. Further, in order to acquire samples from the optimal locations, preliminary in-situ analysis of reservoir architecture, including fluid compositional grading and reservoir compartmentalization, may be required.

Heat capacity and thermal conductivity may be two of the parameters required in compositional gradient equation of state modeling to account for compositional grading caused by thermal diffusion. Knowing whether or not there is compositional grading within the reservoir compartment may be pertinent in understanding the complex reservoir architecture, including the establishment of an oil-water contact level. Correct estimation of oil-water contact level may play an important role in accurately estimating reservoir proven reserve and hence the decision whether or not a client will develop a reservoir field. In examples, the client may be defined as an individual, group of individuals, or an organization. Although the heat capacity and thermal conductivity of mud filtrate and formation fluid may provide high contrast properties that may be used to trend fit contamination, an equation of state may also be used to quantitatively calculate contamination levels.

FIG. 1 illustrates a cross-sectional view of a well system 100. As illustrated, well system 100 may include a sensor package 105 attached to a vehicle 110. In examples, it should be noted that sensor package 105 may not be attached to a vehicle 110 but may be attached to any other suitable object. Sensor package 105 may be supported by a rig 115 at a surface 120. Sensor package 105 may be tethered to vehicle 110 through a conveyance 125. Conveyance 125 may be disposed around one or more sheave wheels 130 located on vehicle 110. During operations, the one or more sheave wheels 130 may rotate to lower and/or raise conveyance 125 downhole. As sensor package 105 is coupled to conveyance 125, sensor package 105 may be displaced accordingly with conveyance 125. Conveyance 125 may include any suitable means for providing mechanical conveyance for sensor package 105 including, but not limited to, wireline, slickline, coiled tubing, pipe, drill pipe, drill string, tubular string, downhole tractor, and/or the like. In some embodiments, conveyance 125 may provide mechanical suspension, as well as electrical connectivity, for sensor package 105. In examples, sensor package 105 may be disposed about a downhole tool (not illustrated). Without limitations, the downhole tool may be any suitable downhole tool configured to perform a well completions operation and/or to obtain measurements while downhole. Information, such as measurements, from the downhole tool may be gathered and/or processed by an information handling system 135.

Systems and methods of the present disclosure may be implemented, at least in part, with information handling system 135. Information handling system 135 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 135 may include a processing unit 140, a network storage device, or any other suitable device and may vary in size, shape, performance, functionality, and price. Information handling system 135 may include random access memory (RAM), one or more processing resources such as a central processing unit (CPU) or hardware or software control logic, ROM, and/or other types of nonvolatile memory. Additional components of the information handling system 135 may include one or more disk drives, one or more network ports for communication with external devices as well as various input and output (I/O) devices, such as an input device 145 (e.g., keyboard, mouse, etc.) and a video display 150. Information handling system 135 may also include one or more buses operable to transmit communications between the various hardware components.

Alternatively, systems and methods of the present disclosure may be implemented, at least in part, with non-transitory computer-readable media 155. Non-transitory computer-readable media 155 may include any instrumentality or aggregation of instrumentalities that may retain data and/or instructions for a period of time. Non-transitory computer-readable media 155 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As illustrated, sensor package 105 may be disposed in a wellbore 160 by way of conveyance 125. Wellbore 160 may extend from a wellhead 165 into a subterranean formation 170 from surface 120. Wellbore 160 may be cased and/or uncased. In examples, wellbore 160 may include a metallic material, such as a tubular string 175. By way of example, tubular string 175 may be a casing, liner, tubing, or other elongated tubular disposed in wellbore 160. As illustrated, wellbore 160 may extend through subterranean formation 170. Wellbore 160 may generally extend vertically into the subterranean formation 170. However, wellbore 160 may extend at an angle through subterranean formation 170, such as horizontal and slanted wellbores. For example, although wellbore 160 is illustrated as a vertical or low inclination angle well, high inclination angle or horizontal placement of the well and equipment may be possible. It should further be noted that while wellbore 160 is generally depicted as a land-based operation, those skilled in the art may recognize that the principles described herein are equally applicable to subsea operations that employ floating or sea-based platforms and rigs, without departing from the scope of the disclosure.

In examples, rig 115 includes a load cell (not shown) which may determine the amount of pull on conveyance 125 at surface 120 of wellbore 160. While not shown, a safety valve may control the hydraulic pressure that drives a drum 180 on vehicle 110 which may reel up and/or release conveyance 125 which may move sensor package 105 up and/or down wellbore 160. The safety valve may be adjusted to a pressure such that drum 180 may only impart a small amount of tension to conveyance 125 over and above the tension necessary to retrieve conveyance 125 and/or sensor package 105 from wellbore 160. The safety valve may typically be set a few hundred pounds above the amount of desired safe pull on conveyance 125 such that once that limit is exceeded, further pull on conveyance 125 may be prevented.

Figure 2:
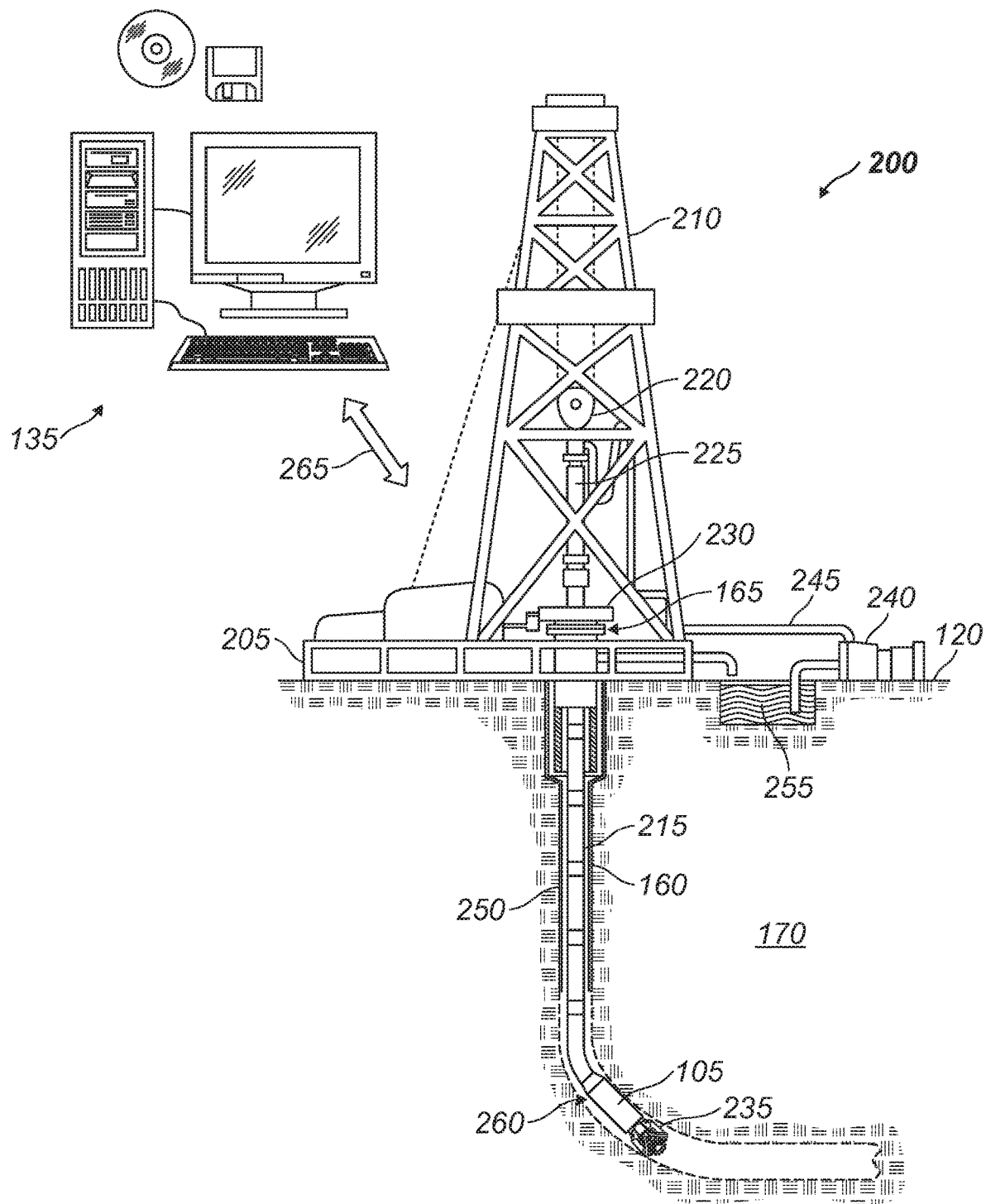
FIG. 2 illustrates an example of a drilling system.

FIG. 2 illustrates an example in which sensor package 105 may be included in a drilling system 200. As illustrated, wellbore 160 may extend from wellhead 165 into subterranean formation 170 from surface 120. A drilling platform 205 may support a derrick 210 having a traveling block 220 for raising and lowering a drill string 215. Drill string 215 may include, but is not limited to, drill pipe and/or coiled tubing, as generally known to those skilled in the art. A kelly 225 may support drill string 215 as it may be lowered through a rotary table 230. A drill bit 235 may be attached to the distal end of drill string 215 and may be driven either by a downhole motor and/or via rotation of drill string 215 at surface 120. Without limitation, drill bit 235 may include roller cone bits, PDC bits, natural diamond bits, any hole openers, reamers, coring bits, and/or the like. As drill bit 235 rotates, it may create and extend wellbore 160 to penetrate various subterranean formations 170. A pump 240 may circulate drilling fluid through a feed pipe 245 to kelly 225, downhole through the interior of drill string 215, through orifices in drill bit 235, back to surface 120 via an annulus 250 surrounding drill string 215, and into a retention pit 255.

With continued reference to FIG. 2, drill string 215 may begin at wellhead 165 and may traverse wellbore 160. Drill bit 235 may be attached to a distal end of drill string 215 and may be driven, for example, either by a downhole motor and/or via rotation of drill string 215 at surface 120. Drill bit 235 may be a part of a bottom hole assembly 260 at the distal end of drill string 215. Bottom hole assembly 260 may further include sensor package 105. Sensor package 105 may be disposed on the outside and/or within bottom hole assembly 260. As will be appreciated by those of ordinary skill in the art, bottom hole assembly 260 may be a measurement-while drilling (MWD) and/or logging-while-drilling (LWD) system.

Without limitation, bottom hole assembly 260 may be connected to and/or controlled by information handling system 135, which may be disposed on surface 120. Alternatively, information handling system 135 may be disposed downhole in bottom hole assembly 260. Processing of information recorded may occur downhole and/or on surface 120. Processing occurring downhole may be transmitted to surface 120 to be recorded, observed, and/or further analyzed. Additionally, information recorded on information handling system 135 that may be disposed downhole may be stored until bottom hole assembly 260 may be brought to surface 120. In examples, information handling system 135 may communicate with bottom hole assembly 260 through a communication line (not illustrated) disposed in (or on) drill string 215. In examples, wireless communication may be used to transmit information back and forth between information handling system 135 and bottom hole assembly 260. Information handling system 135 may transmit information to bottom hole assembly 260 and may receive, as well as process, information recorded by bottom hole assembly 260. In examples, a downhole information handling system (not illustrated) may include, without limitation, a microprocessor or other suitable circuitry, for estimating, receiving, and processing signals from bottom hole assembly 260. Downhole information handling system (not illustrated) may further include additional components, such as memory, input/output devices, interfaces, and the like. In examples, while not illustrated, bottom hole assembly 260 may include one or more additional components, such as analog-to-digital converter, filter and amplifier, among others, that may be used to process the measurements of bottom hole assembly 260 before they may be transmitted to surface 120. Alternatively, raw measurements from bottom hole assembly 260 may be transmitted to surface 120.

Any suitable technique may be used for transmitting signals from bottom hole assembly 260 to surface 120, including, but not limited to, wired pipe telemetry, mud-pulse telemetry, acoustic telemetry, and electromagnetic telemetry. While not illustrated, bottom hole assembly 260 may include a telemetry subassembly that may transmit telemetry data to surface 120. Without limitation, an electromagnetic source in the telemetry subassembly may be operable to generate pressure pulses in the drilling fluid that propagate along the fluid stream to surface 120. At surface 120, pressure transducers (not shown) may convert the pressure signal into electrical signals for a digitizer (not illustrated). The digitizer may supply a digital form of the telemetry signals to information handling system 135 via a communication link 265, which may be a wired or wireless link. The data may then be analyzed and processed by information handling system 135.

Figure 3:
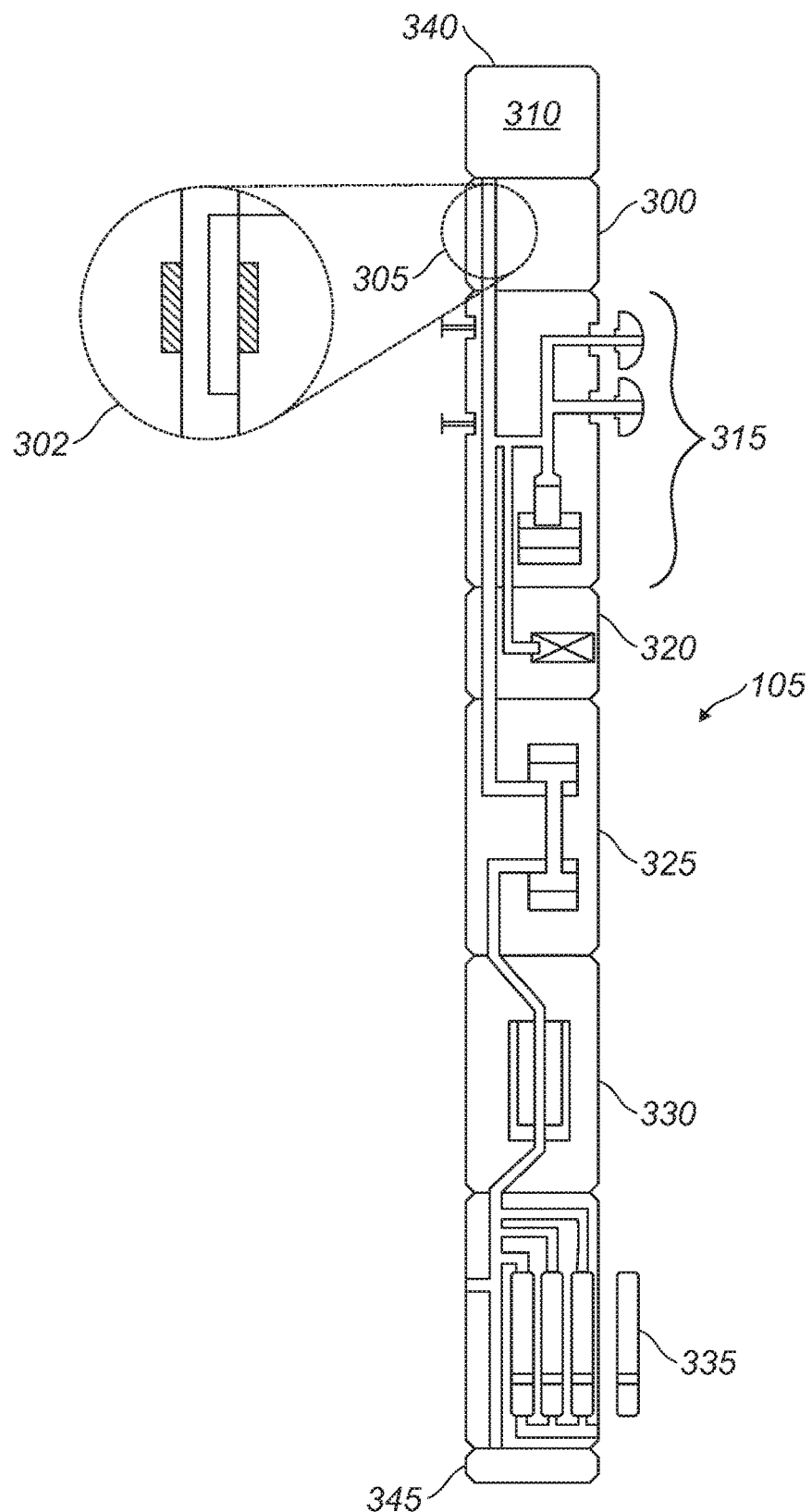
FIG. 3 illustrates an example of a sensor package.

FIG. 3 illustrates an example of sensor package 105. Concerning the present disclosure, sensor package 105 may measure and/or collect fluid samples from wellbore 160 (e.g., referring to FIGS. 1-2). In examples, sensor package 105 may be a reservoir description tool (RDT) with an in-situ formation fluid thermal identification (FTID) module 300. The internal components of FTID module 300 may be illustrated within an expanded circle 302 from an indicated dashed circle 305, showing an example location on sensor package 105. Without limitations, sensor package 105 may include a plurality of modules, such as a position tracking system (PTS) module 310, a dynamic positioning system (DPS) module 315, a temperature and pressure quartz gauge sensor (QGS) module 320, a Flow-Control Pump-Out Section (FPS) module 325, a FLDS and magnetic resonance imaging (MRI) lab module 330, and a mobile communications system (MCS) module 335 which are known to persons of ordinary skill in the art and therefore not described in detail. In examples, the plurality of modules may be arranged in any suitable order or fashion. During operations, sensor package 105 may be coupled to conveyance 125 (e.g., referring to FIG. 1) and disposed downhole. Conveyance 125 may attach to a first end 340 of sensor package 105 through the use of any suitable mechanisms, including, but not limited to, the use of suitable fasteners, threading, adhesives, welding, and/or combinations thereof. Without limitation, suitable fasteners may include nuts and bolts, washers, screws, pins, sockets, rods and studs, hinges and/or any combination thereof. Sensor package 105 may collect fluid samples using one or more probes that are part of the dynamic positioning system module 315 and obtain measurements pertaining to this fluid. In one embodiment, fluid may enter a designated probe and exit first end 340. Alternately, fluid may come from a probe in another tool (for example, sensor package 105) in which case fluid would enter sensor package 105 from a second end 345 and travel from the second end 345 to first end 340. In alternate examples, the fluid may enter sensor package 105 at first end 340 and travel from the first end 340 to second end 345.

Figure 4:
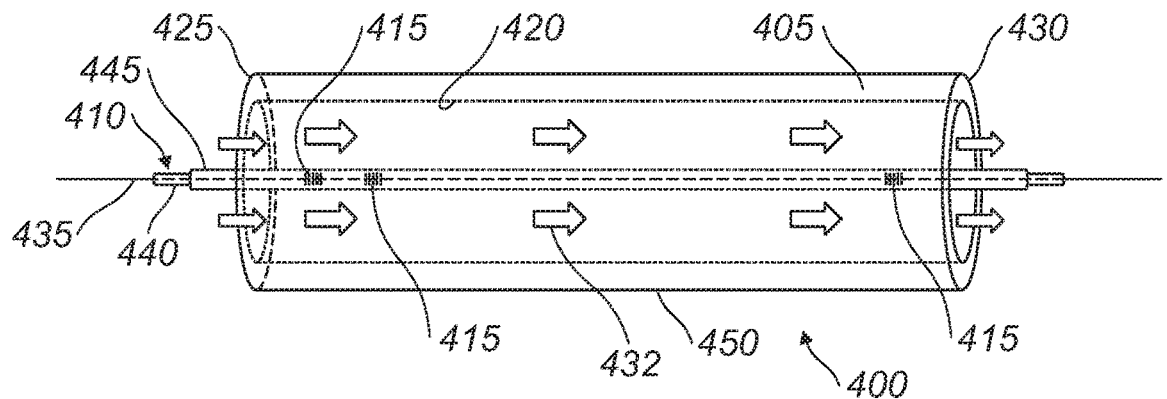
FIG. 4 illustrates an example of a sensor module.

FIG. 4 illustrates an example of a thermal sensor module 400 disposed within FTID module 300 (referring to FIG. 3). Thermal sensor module 400 may include a housing 405, a heat source 410, and a temperature sensor 415. Thermal sensor module 400 may be configured to determine the thermal conductivity of a fluid by measuring the difference in temperature between the central axis of housing 405 and an internal wall 420 of housing 405 for a given applied current (e.g., energy input to the fluid). In examples wherein the fluid is static, this temperature difference may be uniform along the length of housing 405. In examples wherein the fluid is flowing, an axial gradient of temperature may be introduced along the central axis of housing 405, with a first end 425 of housing 405 being cooler than a second end 430 of housing 405. If housing 405 is sufficiently long, the radial temperature profile in the fluid at second end 430 may be the same as for the case in which the fluid is static. The temperature difference between the central axis of housing 405 and internal wall 420, as measured close to second end 430, may be used to determine the thermal conductivity of the fluid in the same way as for the static case. The temperature profile of heat source 410 near first end 425, however, may be representative of the heat carrying capacity of the fluid. Measuring temperature at a plurality of locations along this profile may provide, if the flow rate and the density of the fluid is known, the specific heat capacity of the fluid.

In examples, housing 405 of thermal sensor module 400 may be disposed within FTID module 300 (e.g., referring to FIG. 3). Housing 405 may be secured within FTID module 300 through the use of any suitable mechanisms, including, but not limited to, the use of suitable fasteners, threading, adhesives, welding, and/or combinations thereof. Without limitation, suitable fasteners may include nuts and bolts, washers, screws, pins, sockets, rods and studs, hinges and/or any combination thereof. Housing 405 may be any suitable size, height, and/or shape. Without limitation, a suitable shape may include, but is not limited to, cross-sectional shapes that are circular, elliptical, triangular, rectangular, square, hexagonal, and/or combinations thereof. In examples, housing 405 may be a hollow cylinder. It is to be understood that such geometries may provide a response that in many case can be mapped to an effective equivalent cylindrically symmetric geometry making the analysis discussed below usable to those geometries. Said mapping may be achieved from numerical simulation or experiments. In some cases, the mapping to the equivalent axisymmetric case may not be possible and other methods of correlation between measured temperatures (as discussed below) and the thermal conductivity and/or heat capacity may be needed. These may be implemented in fitted equations or look-up tables as required. Without limitation, housing 405 may include any suitable material such as metals, nonmetals, polymers, ceramics, and/or any combination thereof. In examples, housing 405 may include stainless steel 316, Inconel 718, and/or combinations thereof. Housing 405 may include any suitable coating for improved erosion resistance. Housing 405 may have a high thermal capacitance and good thermal conductivity so that the temperature of housing 405 can be assumed to be uniform and approximately constant. For example, a housing 405 made of copper may have a thermal conductivity of $k_{housing}$=315 W/(m·K), whereas housing 405 made of Inconel may have a thermal conductivity of 11.4 W/(m·K) and the temperature may not be as uniform. In certain examples, housing 405 may maintain a uniform temperature through the use of an external thermo-electric device (not shown). In those examples, the temperature may be forced lower by the thermo-electric device so a greater temperature difference may be produced so as to avoid reaching material property limits of the fluid itself, of heat source 410, of other components of thermal sensor module 400, and/or combinations thereof. As illustrated, first end 425 and/or second end 430 of housing 405 may be open so as to allow fluids 432 (as shown as "arrows" flowing through housing 405) to flow through housing 405. Further, heat source 410 may be disposed at the central axis of housing 405 and may traverse through housing 405.

Heat source 410 may serve to produce energy in the form of heat so as to create a temperature difference in the surrounding fluid 432. Heat source 410 may utilize any known heating method that works within an in-situ wellbore environment. Without limitations, heat source 410 may be, for example, heat pumps, heating tape, heating wiring, resistance based, microwave-based, laser flashing or radiant heat based, coiled induction heat based, a heat exchange mechanism, and/or combinations thereof. Without limitation, heat source 410 may include any suitable material such as metals, nonmetals, polymers, ceramics, and/or any combination thereof. As illustrated, heat source 410 may be a rod including an optical fiber 435, a conductive cable 440, and an insulating layer 445. Optical fiber 435 may be used to measure the temperature at a plurality of locations along heat source 410. Optical fiber 435 may be disposed within conductive cable 440. Conductive cable 440 may be any suitable cable capable of providing an electrical current. In examples, conductive cable 440 may include a graphite-epoxy composite material. Conductive cable 440 may be an electro-optical hybrid cable including both one or several electrical wires and one or several optical fibers 435. In certain examples, conductive cable 440 may include copper wires and optical fiber 435. In other examples, conductive cable 440 may include heating wires and thermocouples. Conductive cable 440 may be disposed within insulating layer 445. Insulating layer 445 may serve to insulate conductive cable 440 from the surrounding fluid 432. Without limitations, insulating layer 445 may include material such as Teflon (PTFE), polyimide, ceramics, glass, and/or combinations thereof. In examples, insulating layer 445 may be a uniform layer of PEEK.

As illustrated, a temperature sensor 415 may be disposed within and/or on heat source 410. Temperature sensor 415 may serve to measure the temperature of a substance. Without limitations, temperature sensor 415 may be any one of thermocouples, thermistors, fiber optic sensors, or resistance temperature detectors (RTDs). In examples, there may be a plurality of Fiber Bragg Gratings disposed in optical fiber 435 that serve as temperature sensors 415. The plurality of Fiber Bragg Gratings may be centered at varying wavelengths, which may enable the independent measurement of designated distances between a pair of Fiber Bragg Gratings. The plurality of Fiber Bragg Gratings may be actuated by information handling system 135 (e.g., referring to FIGS. 1-2) at surface 120 (referring to FIGS. 1-2). In other examples, temperature sensor 415 may be an optical frequency-domain reflectometer (such as the OBR 4600 optical backscatter reflectometer produced by Luna Innovations Inc., of Roanoke, Virginia). In those examples, the optical frequency-domain reflectometer may be used in a laboratory environment rather than downhole in a wellbore and may produce measurements in increments of about 0.1 degree Celsius with about a one millimeter spatial resolution. In certain examples, there may be an additional temperature sensor 415 disposed at any suitable location on housing 405. In those examples, temperature sensor 415 may be disposed on internal wall 420 to measure the temperature of the fluid 432 in contact with housing 405. In other examples, temperature sensor 415 may be disposed within and/or on an external wall 450 of housing 405. Because optical fiber sensors such as Fiber Bragg Gratings and OFDR may be sensitive to both strain and temperature, care must be taken in the mechanical design to have a one-to-one relation between strain and temperature in the device (for example, by providing for free thermal expansion of the sensor body), or to have a separate measurement that depends on strain and temperature with a relation that is linearly independent from that of the first measurement so as to permit an unambiguous extraction of the temperature.

Figure 5:
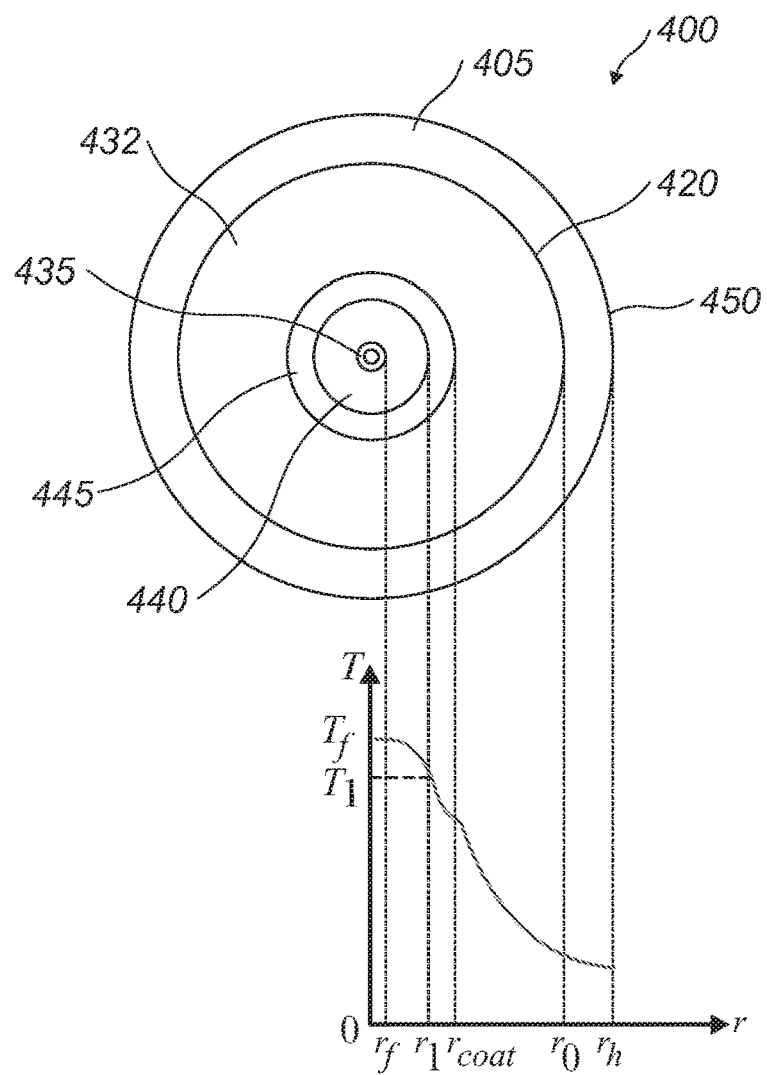
FIG. 5 illustrates a cross-section of a sensor module and shows the radial temperature profile in the different materials.

FIG. 5 shows a cross-section of thermal sensor module 400 and schematically shows the radial temperature profile in fluid housing 405 at internal wall 420 and external wall 450, fluids 432, insulating layer 445, conductive cable 440, and optical fiber 435. An axisymmetric distribution may be assumed. An assumption of uniform temperature along thermal sensor module 400 may be made, which means temperature gradients present due to heat transfer across the connections and coupling between parts may be neglected. As such, heat transfer that may occur axially across first end 425 (e.g., referring to FIG. 4) and second end 430 (e.g., referring to FIG. 4) may be neglected. This approximation may be valid if the thermal sensor module 400 is long compared to its diameter. With this assumption, for a static fluid, the radial temperature distribution shown may apply to all z distance values in the range 0≤z≤L.

Figure 6:
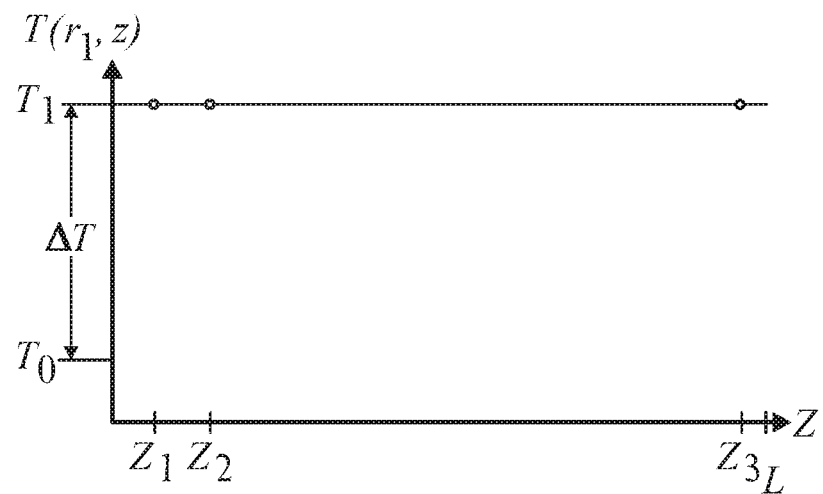
FIG. 6 illustrates an exemplary graph depicting a static fluid.

FIG. 6 illustrates a graph depicting a temperature profile along heat source 410 (e.g., referring to FIG. 4) for a static fluid. Concerning the present graph, $T(r_1, z)$ is the temperature at an outer surface of conductive cable 440 (e.g., referring to FIG. 4) along a designated length of heat source 410, $T_0$ is the temperature of housing 405 (e.g., referring to FIG. 4) at internal wall 420 (e.g., referring to FIG. 4) at an initial radius, $r_0$, $T_1$ is the temperature of heat source 410 at an outer surface of heat source 410, and $\Delta T$ is the difference between $T_1$ and $T_0$. Temperature difference $\Delta T$ may be proportional to the current supplied to heat source 410 and dependent on the thermal conductivity of the fluid, and L is the length of heat source 410. By using this graph, further calculations may be done in order to determine the thermal conductivity of a fluid.

For a static fluid, wherein the mass flow rate, $\dot{m}$, is zero, an initial energy balance may be analyzed to determine the thermal conductivity of the fluid, $k_{fluid}$, with static flow, shown below as Equation 1.

$$q_{source} = Ri^2 = \frac{T_1 - T_0}{\frac{1}{2\pi k_{PEEK}L}\ln\left(\frac{r_{coat}}{r_1}\right) + \frac{1}{2\pi k_{fluid}L} \cdot \ln\left(\frac{r_O}{r_{coat}}\right)} \quad (1)$$

Where $q_{source}$ is the rate of energy output (in watts) of heat source 410, which has outer radius $r_1$, in the fluid chamber between first end 425 (e.g., referring to FIG. 4) and second end 430 (e.g., referring to FIG. 4), R is the electrical resistance (in ohms) of the conductive cable 440, i is the electrical current (in amperes) passing through conductive cable 440, $k_{PEEK}$ is the thermal conductivity of the insulating layer 445, with has outer radius $r_{coat}$, and $k_{fluid}$ is the thermal conductivity of the fluid 432 (e.g., referring to FIG. 4). By rearranging Equation 1, thermal conductivity of the fluid 432 may be calculated as shown below in Equation 2.

$$k_{fluid} = \frac{\ln\left(\frac{r_0}{r_{coat}}\right)}{\frac{2\pi L}{Ri^2} \cdot (T_1 - T_0) - \frac{1}{k_{PEEK}} \cdot \ln\left(\frac{r_{coat}}{r_1}\right)} \quad (2)$$

If heat source 410 has good thermal conductivity (as previously defined), then $T(r_f, z) \approx T(r_1, z)$. If housing 405 has a good thermal conductivity, then $T(r_0, z) \approx T(r_h, z)$ where $r_h$ is the radius of housing 405 at external wall 450 (e.g., referring to FIG. 4). If insulating layer 445 is not present or is thin, $r_{coat} = r_1$, and Equation 3 may be assumed, as shown below.

$$k_{fluid} = \frac{Ri^2 \ln\left(\frac{r_0}{r_1}\right)}{2\pi L \cdot (T_1 - T_0)} \quad (3)$$

In the above analysis, it may be assumed that housing 405 remains at a fixed temperature of $T_0$. In examples, the temperature of housing 405 may be measured using one or more separate temperature sensors 415 (e.g., referring to FIG. 4) and this measurement of $T_0$ is then used in Equations 1 to 3 above. Several measurements of temperature may be made along housing 405, wherein the average of those values is used for $T_0$. Likewise, several measurements of temperature may be made along conductive cable 440, and these values may be averaged to provide the value of $T_1$ to use in Equations 1 to 3 above.

Additionally, the temperature in heat source 410 may have a radial distribution, as shown in FIG. 5. Therefore, depending on where, radially, the temperature sensor 415 is positioned, the measurement made may not be $T(r_1, z)$ but, rather, $T(r<r_1, z)$. For example, an optical fiber 435 (e.g., referring to FIG. 4) may be integrated within a composite rod and centered at r=0. Assuming temperature sensor 415 may have a negligible impact on the temperature distribution inside the heat source 410, the following distribution in Equation 4 may be assumed:

$$T(r) = \frac{Ri^2}{4\pi L k_{rod}}\left(1 - \frac{r^2}{r_1^2}\right) + T_1 \quad (4)$$

where $k_{rod}$ is the thermal conductivity (in the radial direction) of the heat source 410. For optical fiber 435 measuring T_f at r=0, Equation 5 presents:

$$T_1 = T_f - \frac{Ri^2}{4\pi L k_{rod}} \quad (5)$$

It may be assumed that both the fluid 432 (e.g., referring to FIG. 4) and heat source 410 are initially at temperature $T_0$, as well as the surrounding components of thermal sensor module 400. If the current runs through heating element 440 for a known period of time (pulse duration $\tau$), the amount of heat energy placed into the device (Q=R $i^2\tau$) may be determined. This energy may be used to increase the temperature of conductive cable 440, insulating layer 445, fluid 432, and, by continued thermal conduction and convection, housing 405 and the surround medium. Temperature $T_1$ may then be a function of time, and the peak temperature achieved may depend on the total heat input Q, the duration $\tau$, as well as the thermal properties of the fluid 432 and the components of thermal sensor module 400. This presents an avenue for the determination of heat capacity of the fluid but a full analysis may be complex. Empirical relations determined experimentally may need to be relied upon. An alternate method to determine heat capacity of the fluid 432 that does not require pulsing of heat source 410 may be presented as described below. This approach may require fluid 432 to be flowing through the thermal sensor module 400.

Figure 7:
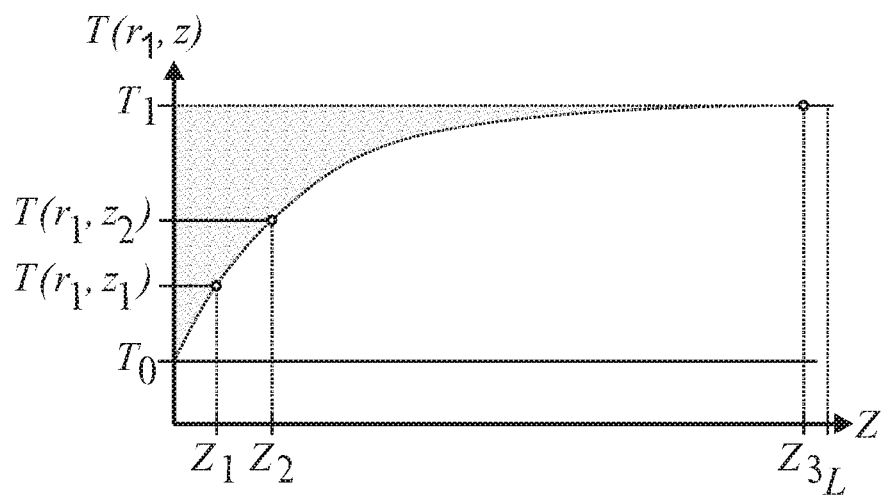
FIG. 7 illustrates an exemplary graph depicting a flowing fluid.

FIG. 7 illustrates a graph depicting a temperature profile along heat source 410 (e.g., referring to FIG. 4) for a flowing fluid. For the flowing fluid case, a portion of the heat produced by heat source 410 may be carried away by the fluid as the fluid travels. Equation 6, shown below, may produce the heat removed by the fluid.

$$q_{fluid} = \dot{m} c_{p\_fluid}(\overline{T_{fluid}}(z=L) - T_0) \quad (6)$$

It may be assumed that the fluid enters thermal sensor module 400 (e.g., referring to FIG. 4) with a given temperature, $\overline{T_{fluid}}$, wherein $\overline{T_{fluid}} = T_0$ at z=0. $\overline{T_{fluid}}$ may exit thermal sensor module 400 with the same radial temperature distribution as for the static flow example. Within Equation 4, $q_{fluid}$ is the heat removal of the fluid, and $c_{p\_fluid}$ is the specific heat capacity of the fluid. The average temperature of the fluid exiting second end 430 (e.g., referring to FIG. 4) of housing 405 (e.g., referring to FIG. 4) may be obtained by integrating temperature over the annular cross-section at a position of z=L, as shown below in Equation 7.

$$\overline{T_{fluid}}(z=L) = T_0 + (T_{1,L} - T_0)\left[\frac{1}{2 \cdot \ln\left(\frac{r_0}{r_1}\right)} - \frac{r_1^2}{(r_0^2 - r_1^2)}\right] \quad (7)$$

The axial profile of the temperature of heat source 410 may be quantified by Equation 8 below:

$$T_1(z) = T_0 + (T_{1,L} - T_0)(1 - e^{-z/l_c}) \quad (8)$$

The temperature heat transfer length $l_c$ is a characteristic of the temperature profile and with sufficient temperature measurement along conductive cable 440, $l_c$ may be obtained from a fit through the profile of Eq. (7) through the data. For example, if $T_0$, the temperature of the housing if known, $T_{1,L}$ the asymptotic temperature along the heat source 410, and at least one additional measurement at a $0 < z_m < L$ position where the temperature is as an intermediate between $T_0$ and $T_{1,L}$, $l_c$ may be determined by inversion of Eq. 9 as follows:

$$l_C = \frac{z_m}{\ln\left[\frac{(T_{1,L} - T_0)}{(T_{1,L} - T_1(z_m))}\right]} \quad (9)$$

This may be repeated for as many intermediate points $T(z_{m_i})$ as are available and the selected value of $l_{c_i}$ may be the average of the obtained values. Alternatively, $l_c$ may be obtained from a fit least square fit of equation through the points of temperature values along the heat source 410. Equation 9 may be used in Equation 10 below to show the radial heat flux per unit length.

$$q'(z) = \frac{T_1(z) - T_0}{\frac{1}{2\pi k_{fluid}} \cdot \ln\left(\frac{r_O}{r_1}\right)} \quad (10)$$

Integrating over a designated length of z may provide the complete radial heat loss, wherein this may be the heat loss due to thermal conduction shown below as Equations 11 and 12.

$$q_{cond} = \int_0^L q'(z) dz = \frac{1}{\frac{1}{2\pi k_{fluid}} \cdot \ln\left(\frac{r_O}{r_1}\right)} \int_0^L (T_1(z) - T_0) dz \quad (11)$$

$$q_{cond} = \frac{(T_{1,L} - T_0)}{\frac{1}{2\pi k_{fluid}} \cdot \ln\left(\frac{r_O}{r_1}\right)} \int_0^L (1 - e^{-z/l_c}) dz \quad (12)$$

Equation 12 may require use of the temperature profile decay length $l_c$. This parameter is related to the shape of the profile and not the absolute value of the temperature shift. To obtain it, the temperature of heat source 410 at a minimum of two positions may be required, and any one of those positions cannot be z=0 (inlet) position. At z=0, it may be known that $T_1(0) = T_0$, and therefore does not help to determine the shape of the temperature profile past z=0. Equations 11 and 12 may be used in the following energy balances displayed in Equation 13.

$$q_{fluid} + q_{cond} = q_{source} \quad (13)$$

The heat produced by heat source 410 may be approximated as Equation 14 below the relation $L = \int_0^L dz$ may be utilized so that Equations 12 and 14 both contain integrals over the same domain.

$$q_{source} \approx \frac{T_{1,L} - T_0}{\frac{1}{2\pi k_{fluid} L} \cdot \ln\left(\frac{r_O}{r_1}\right)} = \frac{(T_{1,L} - T_0)}{\frac{1}{2\pi k_{fluid}} \cdot \ln\left(\frac{r_O}{r_1}\right)} \int_0^L dz \quad (14)$$

Equations 6, 12, and 14 may be substituted into Equation 13 to produce Equations 15 and 16 below in order to solve for $c_{p\_fluid}$.

$$\dot{m} c_{p\_fluid}(\overline{T_{fluid}}(L) - T_0) = \frac{T_{1,L} - T_0}{\frac{1}{2\pi k_{fluid}} \cdot \ln\left(\frac{r_O}{r_1}\right)} \int_0^L e^{-z/l_c} dz \quad (15)$$

$$\dot{m} c_{p\_fluid}(\overline{T_{fluid}}(L) - T_0) = \frac{T_{1,L} - T_0}{\frac{1}{2\pi k_{fluid}} \cdot \ln\left(\frac{r_O}{r_1}\right)} (l_c)\left[1 - e^{-L/l_c}\right] \quad (16)$$

It may be assumed that when thermal sensor module 400 is sufficiently long, $e^{-L/l_c} \ll 1$. As such, Equation 17 below may be a simplified form of Equation 16.

$$\dot{m} c_{p\_fluid}(\overline{T_{fluid}}(L) - T_0) = \frac{(T_{1,L} - T_0)}{\frac{1}{2\pi k_{fluid}} \cdot \ln\left(\frac{r_O}{r_1}\right)} (l_c) \quad (17)$$

As depicted in FIG. 6, the temperature approaches an asymptotical value as the length of thermal sensor module 400 is sufficiently large. At this point, $T(r_1, z_3) \approx T_1$, and $T_{1,L}$ may be substituted for $\overline{T_{fluid}}(L)$, as shown below in Equation 18.

$$\dot{m} c_{p\_fluid}\left((T_{1,L} - T_0)\left[\frac{1}{2 \cdot \ln\left(\frac{r_O}{r_1}\right)} - \frac{r_1^2}{(r_0^2 - r_1^2)}\right]\right) = \frac{T_{1,L} - T_0}{\frac{1}{2\pi k_{fluid}} \cdot \ln\left(\frac{r_O}{r_1}\right)} (l_c) \quad (18)$$

Equation 18 may be rearranged as Equation 19 in order to solve for the specific heat capacity of the fluid, $c_{p\_fluid}$.

$$c_{p\_fluid} = \left(\frac{l_c}{\dot{m}}\right)\left[\frac{4\pi k_{fluid}(r_0^2 - r_1^2)}{\left[(r_0^2 - r_1^2) - 2 \cdot \ln\left(\frac{r_O}{r_1}\right) \cdot r_1^2\right]}\right] \quad (19)$$

As illustrated above in Equation 19, knowledge of $k_{fluid}$ and $\dot{m}$ may be required in order to determine $c_{p\_fluid}$. In the static example of FIG. 6, $k_{fluid}$ may be obtained from Equation 3 using measured values $T_1$ and $T_0$ at any point along $0 < z < L$ and $\dot{m} = 0$. In the flowing case of FIG. 7, Equation 3 may still be used using $T_1$ and $T_0$ measured at z=L if it can be assumed that the temperature difference $(T_{1,L} - T_0)$ has reached its asymptotic value. In examples, this may be ascertained by reducing the flow rate ($\dot{m}$) to a value small enough that $(T_{1,L} - T_0)$ no longer depends on the flow rate. It may be noted, from Equation 16, that for a given $C_{p\_fluid}$, decreasing the flow rate ($\dot{m}$) decreases the length of the transition region, which is characterized by the decay length $l_c$. When $l_c \ll L$, it may be known that $(T_{1,L} - T_0)$ has reached its asymptotic value and can be used in Equation 3 as a proxy for $(T_1 - T_0)$ to supply $k_{fluid}$.

Note that this dependence of the temperature profile on $\dot{m}$ $c_{p\_fluid}$ may provide flexibility during calibration and operation of thermal sensor module 400 as a sensor for heat capacity. For calibration, rather than changing fluid types to change specific heat capacity (by varying $c_{p\_fluid}$), the fluid may remain the same ($c_{p\_fluid}$ is constant), but the flow rate, $\dot{m}$, may be changed instead. Likewise, during use of thermal sensor module 400, changing the flow rate may change the profile of the temperature along heat source 410. This may be used to optimize the contrast in temperature between temperature sensors 415 (e.g., referring to FIG. 4) for $T(r_1, z_1)$, $T(r_1, z_2)$, and $T(r_1, z_3)$.

This method and system may include any of the various features of the compositions, methods, and system disclosed herein, including one or more of the following statements.

Statement 1. A thermal sensor module, comprising: a housing, wherein the housing comprises a first end and a second end, wherein the housing is hollow and configured to allow a fluid to flow into the housing through the first end and exit through the second end; a heat source, wherein the heat source is disposed at a central axis of the housing and traverses at least partially through the housing; and a temperature sensor, wherein the temperature sensor is positioned in the housing to measure temperature of the heat source within the housing.

Statement 2. The thermal sensor module of statement 1, wherein the heat source is selected from a group consisting of a heat pump, heating tape, heating wiring, resistance based, microwave-based, laser flashing or radiant heat based, coiled induction heat based, a heat exchange mechanism, and a combination thereof.

Statement 3. The thermal sensor module of statement 1 or 2, wherein the heat source comprises: an optical fiber; a conductive cable, wherein the optical fiber is disposed within the conductive cable; and an insulating layer, wherein the conductive cable is disposed within the insulating layer.

Statement 4. The thermal sensor module of statement 3, wherein the conductive cable comprises graphite fibers, epoxy, or combinations thereof.

Statement 5. The thermal sensor module of statement 4, wherein the conductive cable further comprises copper wires, heating wires, thermocouples, or combinations thereof.

Statement 6. The thermal sensor module of statement 3, wherein the insulating layer comprises a material selected from a group consisting of polytetrafluoroethylene, polyimide, ceramics, glass, and combinations thereof.

Statement 7. The thermal sensor module of statement 3, wherein the insulating layer is a uniform layer of polyether ether ketone.

Statement 8. The thermal sensor module of statement 1, wherein there are a plurality of temperature sensors within the thermal sensor module, wherein at least one of the plurality of temperature sensors is disposed on the housing, wherein remaining temperature sensors of the plurality of temperature sensors are disposed within the heat source.

Statement 9. The thermal sensor module of statement 8, wherein the temperature sensors disposed within the heat source are Fiber Bragg Gratings, wherein the Fiber Bragg Gratings are disposed within the optical fiber.

Statement 10. The thermal sensor module of any one of the previous statements, wherein the temperature sensor is an optical frequency-domain reflectometer.

Statement 11. A method for determining a thermophysical property of a fluid, comprising: disposing a sensor package downhole into a wellbore with a conveyance; receiving a sample of the fluid with a thermal sensor module disposed within the sensor package; applying heat to the sample of the fluid with a heat source disposed within a housing of the thermal sensor module; and determining a thermal conductivity of the sample of the fluid.

Statement 12. The method of statement 11, wherein receiving the sample of the fluid comprises of pumping the sample of the fluid through the thermal sensor module to model a flowing fluid.

Statement 13. The method of statement 11 or 12, wherein receiving the sample of the fluid comprises of containing the sample of the fluid within the thermal sensor module to model a static fluid.

Statement 14. The method of any one of statements 11 to 13, further comprising of measuring a temperature of the sample of the fluid with at least one temperature sensor.

Statement 15. The method of statement 11, wherein the at least one temperature sensor is disposed within the heat source.

Statement 16. The method of statement 15, wherein the heat source comprises an optical fiber disposed within a conductive cable, wherein the conductive cable is disposed within an insulating layer, wherein the at least one temperature sensor is a Fiber Bragg Grafting disposed within the optical fiber.

Statement 17. The method of claim 16, wherein the insulating layer is a uniform layer of polyether ether ketone.

Statement 18. The method of any one of statements 11 to 15, wherein applying heat to the sample of the fluid comprises of applying a current in a pulsed mode.

Statement 19. The method of any one of statements 13 to 15, or 17, further comprising of determining a specific heat capacity of the sample of the fluid with the thermal conductivity.

Statement 20. The method of any one of statements 13 to 15, 17, or 18, wherein the temperature sensor is a fiber optic cable.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system comprising:
    a sensor package for being disposed in a wellbore with a conveyance;
    a housing disposed within the sensor package, wherein the housing comprises a first end and a second end, wherein the housing is hollow and configured to allow a fluid to flow into the housing through the first end and exit through the second end;
    a heat source disposed within the sensor package, wherein the heat source is disposed at a central axis of the housing and traverses at least partially through the housing; and
    a temperature sensor disposed within the sensor package, wherein the temperature sensor is positioned in the housing to measure temperature of the heat source.

2. The system of claim 1, wherein the heat source is selected from a group consisting of a heat pump, heating tape, heating wiring, resistance based, microwave-based, laser flashing or radiant heat based, coiled induction heat based, a heat exchange mechanism, and a combination thereof.

3. The system of claim 1, wherein the heat source comprises:
    an optical fiber;
    a conductive cable, wherein the optical fiber is disposed within the conductive cable; and
    an insulating layer, wherein the conductive cable is disposed within the insulating layer.

4. The system of claim 3, wherein the conductive cable comprises graphite fibers, epoxy, or combinations thereof.

5. The system of claim 4, wherein the conductive cable further comprises copper wires, heating wires, thermocouples, or combinations thereof.

6. The system of claim 3, wherein the insulating layer comprises a material selected from a group consisting of polytetrafluoroethylene, polyimide, ceramics, glass, and combinations thereof.

7. The system of claim 3, wherein the insulating layer is a uniform layer of polyether ether ketone.

8. The system of claim 1, wherein there are a plurality of temperature sensors within the thermal sensor module, wherein at least one of the plurality of temperature sensors is disposed on the housing, wherein remaining temperature sensors of the plurality of temperature sensors are disposed within the heat source.

9. The system of claim 8, wherein the temperature sensors disposed within the heat source are Fiber Bragg Gratings, wherein the Fiber Bragg Gratings are disposed within the optical fiber.

10. The system of claim 1, wherein the temperature sensor is an optical fiber interrogated using optical frequency-domain reflectometry.

11. A method for determining a thermophysical property of a fluid, comprising:
    disposing a sensor package downhole into a wellbore with a conveyance;
    receiving a sample of the fluid with a thermal sensor module disposed within the sensor package;
    applying heat to the sample of the fluid with a heat source disposed within a housing of the thermal sensor module;
    measuring the temperature of the heat source with a temperature sensor disposed on or within the heat source; and
    determining a thermal conductivity of the sample of the fluid.

12. The method of claim 11, wherein receiving the sample of the fluid comprises of pumping the sample of the fluid through the thermal sensor module to model a flowing fluid.

13. The method of claim 11, wherein receiving the sample of the fluid comprises of containing the sample of the fluid within the thermal sensor module to model a static fluid.

14. The method of claim 13, further comprising of measuring a temperature of the sample of the fluid with at least one temperature sensor.

15. The method of claim 11, wherein the at least one temperature sensor is disposed within the heat source.

16. The method of claim 15, wherein the heat source comprises an optical fiber disposed within a conductive cable, wherein the conductive cable is disposed within an insulating layer, wherein the at least one temperature sensor is a Fiber Bragg Grafting disposed within the optical fiber.

17. The method of claim 16, wherein the insulating layer is a uniform layer of polyether ether ketone.

18. The method of claim 11, wherein applying heat to the sample of the fluid comprises of applying a current in a pulsed mode.

19. The method of claim 11, further comprising of determining a specific heat capacity of the sample of the fluid with the thermal conductivity.

20. The method of claim 11, wherein the temperature sensor is a fiber optic cable.

* * * * *